Dec. 20, 1966     W. E. JOHNSON ETAL     3,292,386
FREEZE CONCENTRATION APPARATUS WITH A TANGENTIAL FEED

Filed June 4, 1963     4 Sheets-Sheet 1

INVENTORS
Wallace E. Johnson
Paul A. Weiss
John H. Davids
BY Fidler, Beardsley, Bradley, Patnaude & Petherbridge
ATTORNEYS

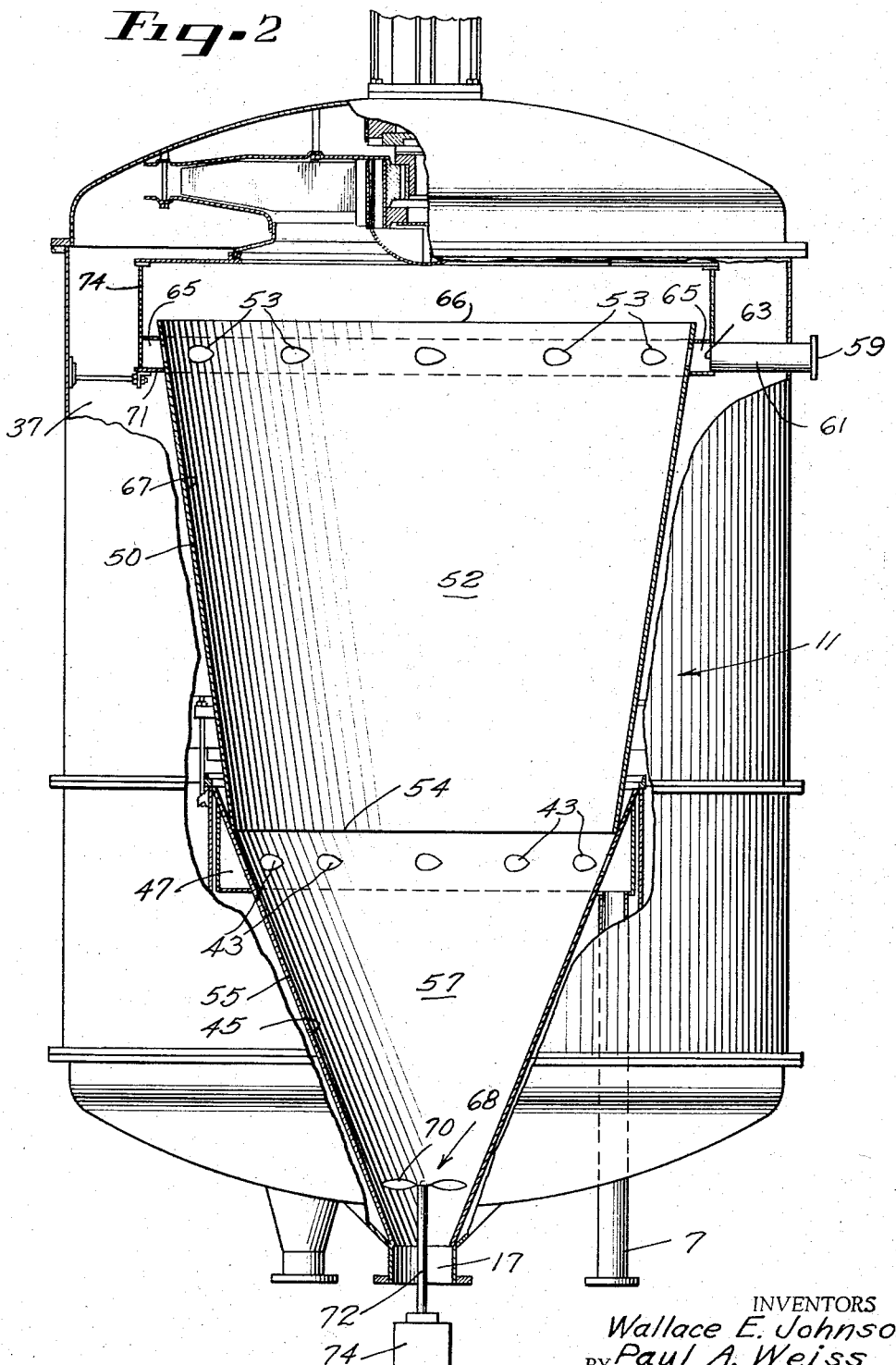

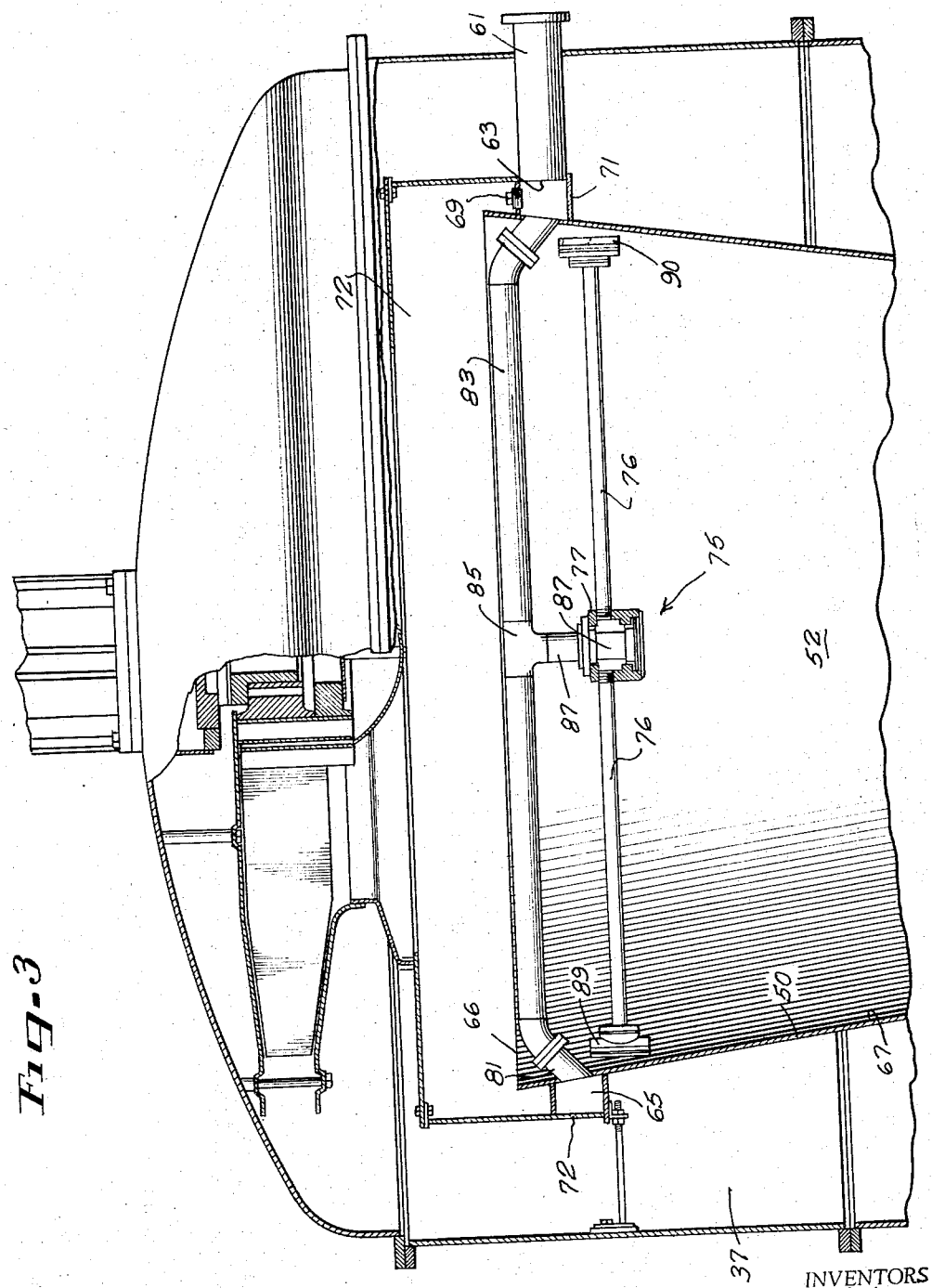

Dec. 20, 1966  W. E. JOHNSON ETAL  3,292,386
FREEZE CONCENTRATION APPARATUS WITH A TANGENTIAL FEED
Filed June 4, 1963  4 Sheets-Sheet 4
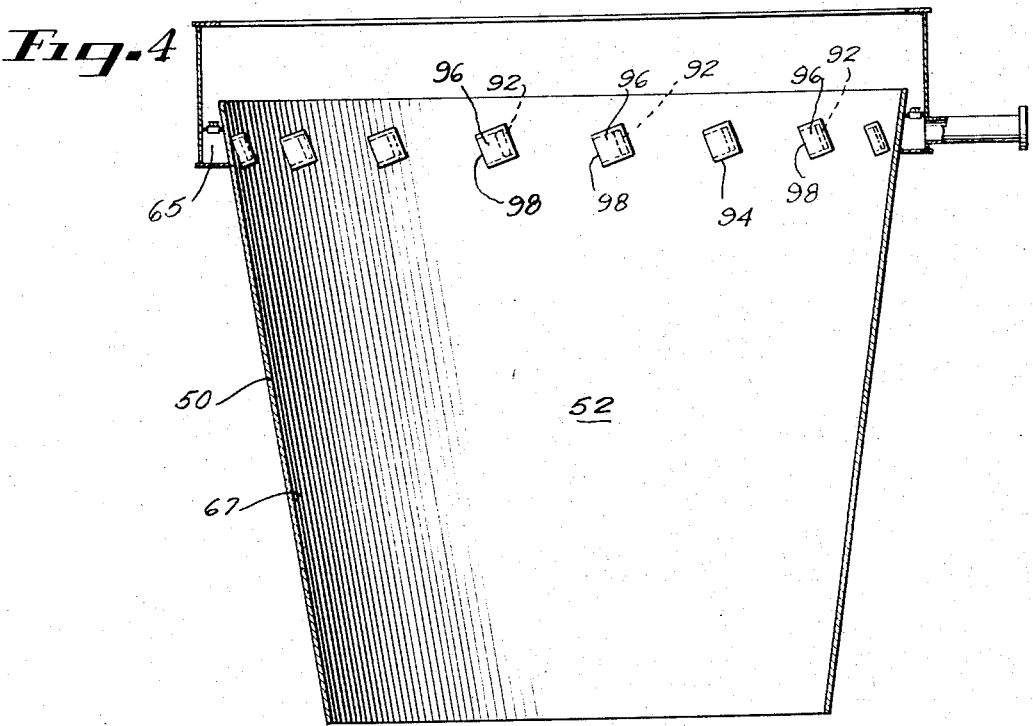
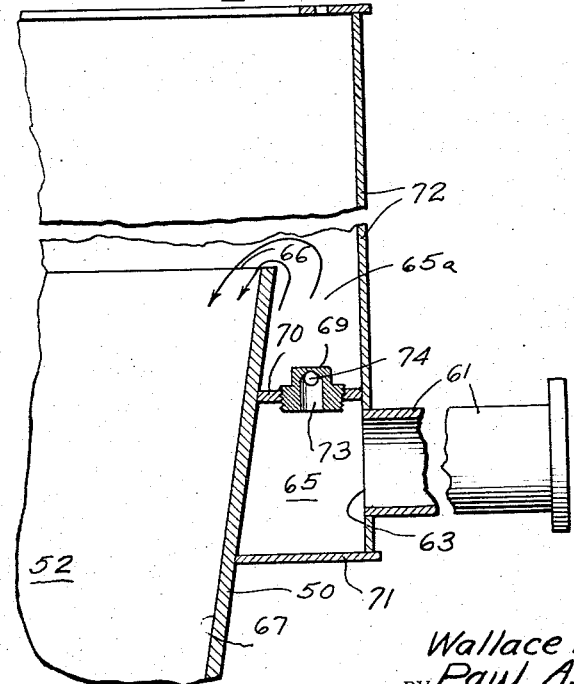
INVENTORS
Wallace E. Johnson
Paul A. Weiss
John H. Davids
BY
Fidler, Beardsley, Bradley, Patnaude & Petherbridge
ATTORNEYS United States Patent Office 3,292,386
Patented Dec. 20, 1966

3,292,386
FREEZE CONCENTRATION APPARATUS WITH A TANGENTIAL FEED
Wallace E. Johnson, Paul A. Weiss, and John H. Davids, Beloit, Wis., assignors to Desalination Plants (Developers of Zarchin Process) Limited, Tel Aviv, Israel, a limited company of Israel
Filed June 4, 1963, Ser. No. 285,528
9 Claims. (Cl. 62—123)

This invention relates to new and improved methods and means for separating a solvent in substantially pure form from a solution and is more particularly directed to new and improved apparatus for vacuum flash freezing of the solvent to separate the solvent as vapor and ice from the solution.

One of the major problems associated with the design of vacuum flash freezing apparatus for use, for example, in desalination systems, is that of efficiently converting the incoming sea water to ice, vapor and a solution of brine more concentrated in salt content than the incoming sea water.

Another such design problem is that of efficiently moving vapor from the vacuum flash freezing apparatus.

In desalination systems heretofore employed to produce fresh water from sea water by vacuum flash freezing evaporation of sea water in apparatus which produces ice and water vapor from the sea water in a vacuum evaporating chamber, means have been employed to move the water vapor from the vacuum evaporating chamber. For example, in the copending United States application, Serial No. 195,118, the disclosure of which is hereby incorporated by reference herein, there is disclosed a new and improved radial compressor which is mounted above the vacuum flash evaporating chamber and which has an inlet opening into the vacuum evaporating chamber and an outlet opening into a vapor condensing chamber of vapor condensing apparatus in which said water vapor is condensend, for example, by contact with ice produced in the vacuum evaporating chamber after washing of brine particles from the ice.

A compressor so utilized must be capable of moving large volumes of water vapor from the vacuum evaporating chamber, the exact volume so moved, of course, will depend upon the operating conditions of the desalination system, for example, the fresh or potable water output requirements of the system. Thus, it will be appreciated that the compressor used must be a high speed compressor and capable of moving large volumes of vapor from the vacuum freezing chamber to the condensing chamber.

However, a disadvantage inherent in the use of high speed compressors for such purposes is that of "carryover" of particles, such as water droplets and salt, entrained in the water vapor, from the vacuum freezing chamber into the compressor housing. These particles, moving at high speed through the compressor, cause damage to the compressor structure, for example, to the blades of the compressor and also increase the salinity of the product water in the condensing chamber.

Another problem associated with the design and construction of such desalination systems employing vacuum evaporating chambers is the production of deleterious effects of ice accumulations in the vacuum chamber. Ice accumulations may build up adjacent the inlet of the vacuum evaporating chamber and thereby minimize desirable contact of the incoming sea water with the wall of the chamber. Similarly, plugging of the outlet of the vacuum chamber by ice produced therein is also a problem inherent in the utilization of such vacuum freezing apparatus.

With the present invention, the above-described problems and difficulties of the prior art are substantially overcome by employment of vacuum evaporating chambers which increase the freezing capacity of the vacuum freezing equipment, minimize the number of water droplets formed in the vacuum chamber without sacrifice in the fresh water output of the system, by providing means for controlling distribution of the sea water introduced into the vacuum evaporating chamber, means for controlling the effective freezing area of sea water in the evaporating chamber, and means for controlling the flow pattern of the sea water in the evaporating chamber. In addition, in accordance with one aspect of the present invention, the problems associated with ice accumulations at the inlet and outlet of the vacuum chamber are substantially reduced.

It is, therefore, an object of the present invention to provide new and improved vacuum flash freezing evaporation apparatus for flash evaporation of a solvent to separate the solvent in substantially pure form from a solution.

Another object of the present invention is to provide new and improved vacuum flash freezing evaporation apparatus for producing ice and water vapor from salt water.

Still another object of the present invention is to provide new and improved vacuum flash freezing evaporation apparatus for flash evaporation of sea water in a desalination system.

A further object of the present invention is to efficiently utilize the available wall area of the vacuum evaporating chamber of vacuum flash evaporation apparatus to produce ice.

A still further object of the present invention is to increase the residence time of the incoming sea water in the vacuum chamber of vacuum flash evaporation equipment.

Another object of the present invention is to provide vacuum flash evaporation apparatus for producing vapor of a solvent from a solution which minimizes entrainment of droplets of the solution with the vapor produced in the apparatus.

Still another object of the present invention is to provide vacuum flash freezing apparatus for a desalination system which minimizes plugging of the outlet of the apparatus employed for discharging ice and solution therefrom.

These and other objects, features and advantages of the present invention will become readily apparent from a careful consideration of the following detailed description, when considered in conjunction with the accompanying drawing, illustrating preferred embodiments of the present invention, wherein like reference numerals and characters refer to like and corresponding parts throughout the several views and wherein:

FIG. 2 is another embodiment of vacuum flash freezing apparatus constructed in accordance with the present invention;

FIG. 3 is an enlarged fragmentary view in vertical section illustrating alternative forms of inlet assemblies for introducing sea water into the freezing chamber of the apparatus of FIG. 2, and FIG. 3a is an enlarged fragmentary view of FIG. 3, and FIG. 4 is an enlarged fragmentary view in vertical section of another embodiment of a sea water inlet assembly.

Figure 1:
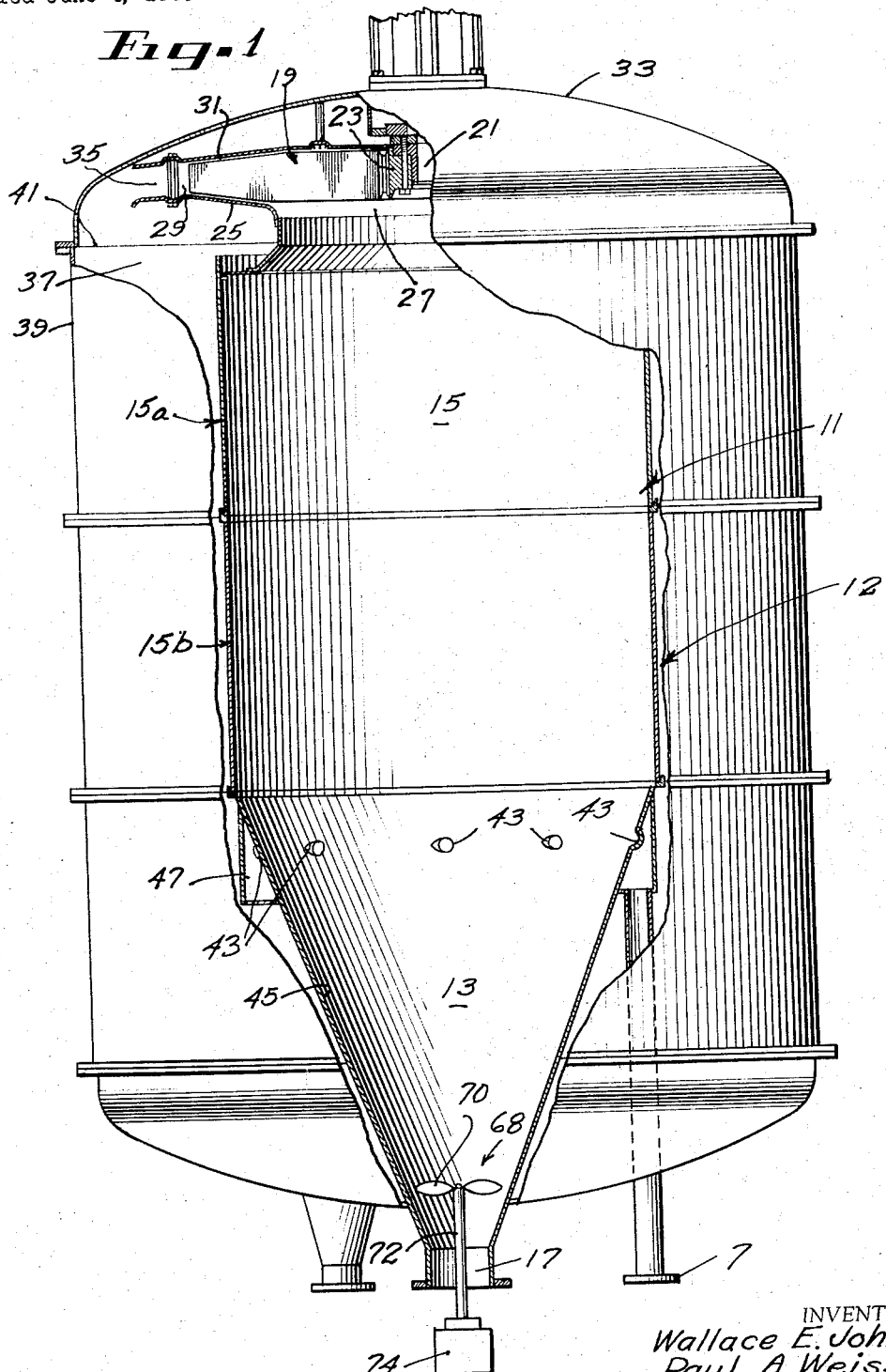
FIG. 1 is a view in vertical section of vacuum freezing apparatus constructed in accordance with the present invention.

Briefly stated, the present invention involves the concept of tangentially introducing sea water onto a frustoconically tapered wall of a vacuum flash freezing evaporating chamber to form a swirling, vortexing mass of ice and sea water, to thereby increase the ice-making efficiency of the freezing chamber by spreading the sea water onto the wall surface of the freezing chamber to form ice, and to prevent ice so produced from plugging the ice and brine outlet of the chamber.

Tangential introduction of the sea water into the chamber for contact with the frusto-conical wall of the freezing chamber will increase the residence time of the sea water in the chamber, will spread the sea water onto the chamber wall in a swirling, sheet-like, vortexing mass to increase contact of sea water with the wall surface, and will minimize the possibility of the creation of ice formations adjacent the inlets of the chamber. In addition, tangential introduction of the sea water onto the frusto-conical wall surface of the chamber will cause formation of a swirling vortexing mass of ice and brine adjacent the outlet of the chamber. Vortexing of the mass will not only increase the residence time of the sea water in the chamber to enhance exposure of the sea water to the vacuum conditions of the chamber, but also will cause turbulence in the mass which will enhance the possibility of exposure of any particular sea water molecule within the mass to the vacuum conditions in the chamber.

Although the present invention has a variety of applications, the embodiments thereof appearing in the drawing are shown as sub-assemblies of a vacuum flash freezing desalination system for producing fresh water from sea water, such as the system disclosed in co-pending United States application No. 103,114 the disclosure of which is hereby incorporated herein by reference.

Referring to the embodiment of the present invention appearing in FIG. 1, there is shown a vacuum flash evaporating assembly, generally indicated by the numeral 11, which comprises a vacuum flash freezing tank 12 including a frusto-conically tapered sea water inlet and evaporating chamber 13 which is in communication with an upper cylindrical section which may be constructed in two interconnected parts 15a and 15b and which defines a vapor flow chamber 15. The lower chamber 13 tapers downwardly to an ice and brine outlet 17 and the upper chamber 15 has an open upper end over which is disposed a radial compressor assembly 19 having an axially extending shaft 21 and bladed rotor 23. A suitable compressor for employment with the present invention is disclosed in copending application, Serial No. 195,118.

A shroud 25 of the compressor 19 is provided with an axial inlet 27 communicating the vapor flow chamber 15 with the compressor rotor blade chamber 29 defined by the shroud 25 and a second shroud 31 carried by a cover 33. The second shroud 31 defines with the first shroud 25 a radial vapor outlet 35 of the compressor 19. The vapor outlet 35 of the compressor communicates with a vapor condensing chamber 37 of a condensing tank 39 which is concentric with and surrounds the freezing tank 12. The outer condensing tank 39 has a bottom wall, cylindrical side wall and an open top 41 closed by the cover 33. The compressor 19 is designed to efficiently move water vapor formed from sea water in the freezing chamber 13 into the condensing chamber 37. Means (not shown) are provided to evacuate the tank 12.

To form water vapor and ice from the sea water in the vacuum freezing chamber 13, preconditioned sea water is supplied into the chamber 13 which is maintained under low pressure, for example, 3.2 mm. Hg, through a sea water inlet assembly comprising a plurality of peripherally disposed and circumferentially spaced inlets 43 located adjacent the upper end of the lower chamber 13. Inlets 43 are designed to introduce tangentially the sea water in streams into the chamber 13 and onto the wall 45 of the chamber 13.

The incoming sea water is supplied to the inlets 43 from an annular manifold 47 mounted exteriorly of the freezing tank 11 and the inlets 43 introduce the sea water in tangential streams onto the frusto-conical wall 45 of the tank 12. The streams of water introduced from the individual inlets 43 overlap and combine thereafter to flow in a swirling, spiralling, vortexing mass down the wall of the chamber 13 in sheet-like form and, while the sea water is in contact with this wall surface, ice crystals are formed from a portion of the sea water.

The sea water is introduced into the chamber for contact with the wall surface to maintain the sea water in sheet-like form and to thereby expose a large sea water evaporating surface to the vacuum conditions of the chamber 13 so that ice and vapor are formed from a portion of the incoming sea water spiralling and swirling down the wall 45.

By flowing the sea water down the wall in a swirling sheet-like mass from a plurality of sea water inlets for the purpose of forming ice crystals from the sea water, the present invention provides means for efficiently utilizing the available wall area of the freezing chamber to produce ice.

The inlets 43, therefore, efficiently distribute and condition the incoming sea water flow pattern so that, as the sea water streams tangentially enter the tank chamber 13, the streams overlap and combine adjacent the inlets to form a sheet-like pattern, the sea water flowing in a vortexing sheet-like mass down the wall 45 of the freezing chamber 13. The location of the inlets 43 relative to the bottom of the tank 12 is intended to provide a residence time for the sea water flowing on the wall 45 sufficient to form ice crystals from a portion of the sea water. The frictional contact of the sea water with the wall 45 also reduces the downward velocity of the sea water and thus cooperates with the inlets to provide sufficient residence time of the sea water in the chamber to form ice crystals.

The swirling vortexing mass of ice and brine continues flowing in contact with the frusto-conical wall 45 of the chamber 13 to the discharge outlet 17 from which the mixture of ice and brine is delivered to other parts of the desalination system (not shown).

Vortexing and swirling of the mass of ice and brine adjacent the outlet 17 minimizes the possibility of plugging of the outlet 17 by the ice formed in the chamber. Plugging is further minimized by employing an agitator assembly 68.

In the arrangement appearing in FIG. 1, an agitator assembly 68, located adjacent the bottom of the freezing chamber 13, is provided for enhancing the vortexing of the mass of ice and brine. The agitator assembly 68 may take the form of a plurality of spaced radial blades 70 mounted on a shaft 72 driven by a suitably sealed motor 74 located exteriorly of the freezing tank 11. The agitator assembly 68 cooperates with the frusto-conical configuration of the bottom section of the freezing tank wall 45 to maintain the vortexing condition of the mass adjacent the outlet 17 to thereby minimize the possibility of ice chunks forming which may cause plugging of the brine and ice mixture outlet 17. It will be appreciated that the agitator assembly 68 may be employed with any of the embodiments disclosed in this application to prevent ice formations at the outlet and plugging thereof.

In this arrangement, a vortexing mass of ice and brine is established and maintained in the lower frusto-conical chamber 13 of the tank 12 adjacent the outlet 17 thereof. Vortexing of this mass continuously changes the molecules of salt water present at the surface of the mass and exposed to the surface freezing conditions of the space above the mass to increase the quantity of ice produced in the chamber. The turbulence induced in the mass of ice and sea water by vortexing of the mass serves as a substitute, to some degree, for an increase in the actual wall surface area of the freezing chamber provided for contact with the sea water to cause transformation thereof into water vapor and ice. Thus, with employment of the vortexing mass concept, the ice producing capacity of the tank may be utilized efficiently without an actual increase in the size of the tank.

It will be appreciated, therefore, that, by tangentially introducing the sea water onto the frusto-conical inner wall surface of the vacuum freezing chamber, the incoming sea water is conditioned for producing therefrom an efficient quantity of ice and vapor without plugging of the inlet or outlet of the tank, and that the available ice producing area of the chamber is efficiently utilized.

One of the problems associated with the design of vacuum freezing apparatus is that of "carry-over" of vapor-entrained, water and salt particles into the compressor assembly. These particles may cause damage to the compressor assembly. "Carry-over" of the sea water or salt particles with the water vapor is substantially minimized with the assembly of FIG. 1. It will be appreciated that, with a compressor assembly 19 operating at, for example, 3600 r.p.m., the water and salt particles may travel randomly at high velocities in the blade chamber of the compressor and impinge on the shrouds, then bounce back and impinge on the rotor blades thereby presenting the possibility of damage to the blades. To minimize such "carry-over," the inlets 43 are located in the lower frusto-conical chamber 13. Tangential introduction of the sea water onto a frusto-conical wall also assists in minimizing such "carry-over" problem.

Thus, the problem of "carry-over" is considerably reduced with the assembly of FIG. 1 and, by frusto-conically shaping the lower section of the tank efficient utilization of the wall surface area available for freezing is provided. The location and spacing of the inlets 43 also tends to smooth out the flow pattern of the incoming sea water as it is introduced into the chamber 13, and such smoothing contributes to the minimization of the "carry-over" problem.

In the operation of the apparatus of FIG. 1, the sea water is introduced through an inlet pipe 7 into the manifold 47 from which it flows through the plurality of inlets 43 which distribute and condition the sea water as it is introduced into the chamber 13 by flowing the water tangentially in the same direction onto the frusto-conical wall 45 of the chamber 13 in streams which overlap and combine to form a swirling sheet-like turbulent mass which flows along the wall to the outlet 17 for discharge from the chamber. The chamber is maintained under vacuum conditions by means not shown. In swirling and spiralling along the wall 45, ice crystals are formed from a portion of the sea water which mixes in the vortexing mass with the concentrated brine to form a slurry of ice and brine which then flows from the discharge outlet 17. The vapor formed in the chamber 13 flows upwardly under the influence of the compressor 19 through the inlet 27 of the compressor and is discharged from the outlet 35 of the compressor into the condensing chamber 37.

In the embodiment of the present invention appearing in FIG. 2 the vacuum freezing assembly includes a plurality of peripheral primary sea water inlets 53 shown located in the upper portion of an upper frusto-conically shaped tank section 50 which defines an upper vacuum freezing chamber 52. The lower edge 54 of the section 50 is joined to the upper portion of a lower frusto-conically shaped tank section 55 which defines a lower vacuum freezing chamber 57. The tank section 55 corresponds to the lower frusto tank section of the apparatus of FIG. 1 which defines the chamber 13.

In the embodiment of FIG. 2 the sea water in introduced from a source (not shown) to an inlet 59 of a pipe 61 located in the condensing chamber 37. The inlet pipe 61 has an outlet 63 leading to a manifold 65 which is circumferentially arranged around the tank section 50 and which is in communication with the inlets 53 from which the seat water is introduced tangentially and in the same direction onto the wall surface 67 of the chamber 52. The sea water is introduced from the inlets 53 in streams which overlap and combine to form a swirling, sheet-like, spiralling and vortexing mass which flows along the wall 67 and wall 45 to the outlet 17.

It will be observed that the total wall surface area of the assembly of FIG. 2 and, thus, the residence time of the sea water in the assembly is increased when compared to the embodiment of FIG. 1. The ice making capacity, therefore, of the assembly of FIG. 2 is considerably increased when compared to the ice making capacity of the apparatus of FIG. 1. However, the "carry-over" problem of the assembly of FIG. 2, it will be appreciated is not as minimal as the problem of "carry-over" associated with the apparatus of FIG. 1.

An agitator assembly 68 is also employed in the arrangement of FIG. 2 to assist in maintaining the vortexing condition of the mass of the ice and sea water and to prevent ice chunk formation and ice chunk plugging of the outlet 17.

The operation of the apparatus of FIG. 2 is comparable to the above-described operation of the apparatus of FIG. 1.

In FIGS. 3 and 3a, there is disclosed a modification of the sea water inlet arrangement of FIG. 2 including an inlet pipe 61 which supplies through an outlet 63 incoming sea water to an annular flow channel manifold 65 which externally surrounds the upper edge 66 of the vacuum tank. The upper edge 66 of the tank acts as a weir in the following manner: the manifold 65 communicates with an upwardly open annular channel 65a through a plurality of circumferentially spaced nozzles 69 which are suitably located in the upper wall 70 of the manifold 65 which is defined by an upper wall 70, the wall 67 of the tank section 50, a bottom wall 71 and a sleeve wall section 72 which supports the tank section 50. Each of the nozzles 69 has an inlet bore 73 which is located at right angles to the horizontal axis of the manifold 65. Each of the inlet bores 73 communicate with an outlet bore 74 (FIG. 3a) which is at right angles to the inlet bore 73. Each of the outlet bores 74 face in the same direction so that sea water, flowing from the outlets 74 into an upper channel 65a, will be directed tangentially into the channel 65a whereby the sea water in the channel 65a will swirl around in the channel. It will be observed that the channel 65a is open at the top thereof so that as the level of the sea water in the channel 65a is raised, the sea water will flow, as indicated by the arrows in FIG. 3a, over the edge 66 of the tank section 50 into the chamber 52. The swirling action of the sea water in the channel 65a is of sufficient moment that such swirling action is imparted to the sea water flowing over the edge 66 into the chamber 52 whereby the sea water is introduced tangentially onto the wall of tank section 52 to swirl in a spiralling, vortexing mass similar to the flow pattern above described in connection with the embodiments of FIGS. 1 and 2. Thus, in the embodiments of FIGS. 3 and 3a the sea water is tangentially introduced into the chamber 52 from which ice is formed and the sea water and ice continues to flow along the wall in a spiralling sheet-like form to a location adjacent the outlet 17 (not shown) where the sea water and ice forms a vortexing mass which is discharged from the chamber through outlet 17 (not shown).

It will be appreciated that the same flow pattern will occur in the embodiment of FIGS. 3 and 3a employing nozzles 69, as occurs in the chamber 52 of the assembly of FIG. 2 which results in an efficient utilization of the available wall surface area of the chamber for producing ice from the sea water and which results in a prolonged residence time for the sea water in the chamber to produce ice. Agitator means 68 (not shown) are also employed with the arrangement of FIG. 3.

FIG. 3 also discloses another form of means for introducing sea water tangentially onto wall 67 and into the chamber 52. Such means take the form of a rotary spray assembly, generally indicated by the numeral 75, which is located in the chamber 52. The rotary spray assembly 75 may be used in conjunction with or in lieu of the inlet assemblies of FIGS. 1, 2 and 3. The rotary assembly 75 comprises a plurality of conduits 76 carried by a rotatable rotor 77 which is driven by reaction of fluid flowing through the conduits 76. The assembly 75 is supplied sea water from a fixed conduit arrangement including a pair of conduits 81 and 83, each of which is fixedly connected at one end to the manifold 65, which supplies sea water to the conduits 81 and 83. The stationary conduits 81 and 83 are connected at their other ends to a T manifold 85 which supplies the sea water to a feed conduit 87. The conduit 87 is in fluid communication through passages (not shown) formed in the rotor 77 with an internal accumulation chamber 87 of the rotor. The chamber 87 is in fluid communication with each of the rotatable conduits 76.

At their outer ends, each of the conduits 76 carries a spray nozzle 89 located closely adjacent the wall 67 of the tank section 50. Each nozzle 89 has a rectangularly shaped and vertically extending outlet 90 for laying sea water tangentially on to the wall 67 of the tank section 50 in a flat stream. The sea water is supplied from the nozzles 89 at a speed sufficient to cause rotation of the conduits 76.

Tangential introduction of the sea water onto the wall of the tank section 50 from the rotating nozzles 89 imparts a sheet-like, spiralling, swirling flow pattern to the sea water moving along the wall 67 of the tank section 50 from which ice is formed to a location adjacent the outlet 17 (not shown) where the sea water and ice forms a swirling vortexing mass or slurry. Thus, with employment of the assembly 72, the sea water is tangentially introduced into the chamber 52 and onto the wall 67 in a mass which follows a spiral path swirling along the wall 67 of the tank to the outlet 17 to enchance exposure of sea water to the vacuum conditions of the tank, to cause turbulence in the mass, to create a vortexing mass adjacent the outlet 17, and to increase the residence time of the sea water in the tank whereby the ice-making efficiency of the tank is increased. The agitator means 68 (not shown) are also employed in this arrangement.

Referring to FIG. 4 there is shown a sea water inlet assembly which includes a plurality of vertically extending slot inlets 92, indicated by the dotted lines in FIG. 4, which are circumferentially spaced around the periphery of the tank section 50 and each of which communicates with the sea water manifold 65. The inlet slots 92 are so formed that their longer axis is at an angle to the vertical axis of the chamber 52 and each of the slots is provided with a flow deflection plate 94. Each of the deflector plates 94 is a channel shaped member having a channel 96 communicating with the corresponding slot 92. The channel 96 is provided to direct flow of sea water from the outlet 98 thereof in a flat, rectangular sheet tangentially onto the wall 67 of the tank section 50. The flow deflection plates 94 are so arranged relative to each other so that the stream issuing from the outlet 98 of each of the plates 94 will avoid impinging on the adjacent plate 94. The outlets 98 of the channels 96 are so arranged that the sea water streams issuing from the outlets combine to form a sheet-like swirling, spiralling mass of ice and sea water which moves along the wall 67 of the tank section 50 to a location adjacent the outlet 17 (not shown) where a vortexing mass or slurry of ice and brine is formed which is discharged through the outlet 17. Agitator means 68 (not shown) may also be employed with the arrangement of FIG. 4.

Thus, with the present invention, it will be appreciated that, by tangentially introducing sea water onto a frustoconical wall of a vacuum freezing chamber to form a swirling, spiralling mass of ice and sea water which flows along the wall in sheet-like form to a location adjacent the outlet of the chamber where the slurry of swirling ice and sea water forms a vortexing mass, efficient utilization of the available wall surface area of the chamber is achieved to increase the evaporation surface of the sea water exposed to the vacuum freezing conditions of the chamber, to cause turbulence in the sea water, and to prolong the residence time of the sea water in the chamber, whereby the freezing efficiency of the chamber is enhanced.

Although various modifications of the present invention will be readily apparent to those versed in the art, it should be understood that what is desired to be embodied within the scope of the patent warranted hereon are all such embodiments as reasonably and properly fall within the scope of the contribution to the art hereby made.

We claim:

1. Freezing apparatus for separating a solvent in substantially pure form from a solution comprising a vessel including an upper vapor flow section and a lower frusto-conical section which defines a vacuum flash freezing chamber, a vapor flow outlet for said vapor flow section, means for withdrawing vapor from said vapor flow section, a slurry outlet located in said frusto-conical section for removing a slurry of ice of the solvent and the remainder of the solution from the chamber, means for maintaining vacuum conditions in said chamber to produce an ice slurry of frozen solvent in the solution, and solution discharge means including a plurality of inlet means distributed on the inside face of the frusto-conical section in the upper part thereof and directed tangentially for discharging solution into said vessel and for tangentially directing said solution onto the inner wall of said section defining said chamber in streams which overlap and combine whereby solution swirls downwardly along a spiral path on the inner wall of said chamber to expose the maximum solution surface to the vacuum conditions in the chamber to produce an ice slurry adjacent the slurry outlet forming a vortexing slurry of ice and solution which is dischargeable through said slurry outlet.

2. The apparatus of claim 1 wherein said solution discharge means for discharging solution into said vessel includes a plurality of spaced inlets located about the upper portion of the frusto-conical section for tangentially supplying the solution onto the wall of the upper section in streams which overlap and combine to follow said spiral path and to form said vortexing slurry adjacent the slurry outlet, and a manifold assembly for supplying incoming solution to said inlets.

3. The apparatus of claim 8 wherein said upper section is also frusto-conical in configuration and wherein said solution discharge means for discharging solution includes a plurality of circumferentially spaced inlets located about the upper portion of the upper section for tangentially supplying the incoming solution onto the wall of the upper section in streams which overlap and combine to form said swirling mass which follows said spiral path along the inner wall surfaces of the upper and lower sections to a location adjacent the slurry outlet where said mass forms a vortexing slurry of ice and solution, and a manifold assembly for supplying incoming solution to said inlets.

4. The apparatus of claim 1 including means for controlling the direction of flow of solution from solution discharge means.

5. The apparatus of claim 1 including agitating means for maintaining said slurry of ice and solution under vortexing conditions adjacent the slurry outlet.

6. The apparatus of claim 1 wherein said means for removing vapor is a compressor.

7. The apparatus of claim 1 wherein said solution discharge means for discharging solution comprises rotating means in said vessel for tangentially supplying solution water onto the inner peripheral walls of said vessel.

8. The apparatus of claim 7 wherein said rotating means comprises a pair of conduit arms radiating from a rotatable central fluid manifold, said arms each carrying a nozzle adjacent the wall of said vessel for discharging solution tangentially onto said wall, and a device for supplying incoming solution to said manifold whereby flow of solution from said nozzles causes rotation of said arms and manifold.

9. Apparatus for separating a solvent in substantially pure form from a solution comprising: a vessel including an upper section defining a vapor flow chamber and a lower frusto-conical section defining a vacuum flash freezing chamber, a vapor flow outlet in the upper section, means for withdrawing vapor from said vapor flow section, an outlet located in said frusto-conical section for a slurry of ice of the solvent and the remainder of the solution, means for maintaining vacuum conditions in said lower chamber, and means for supplying incoming solution tangentially into said vessel and onto the wall of said vessel to form a swirling mass which flows downwardly along a spiral path to a location adjacent the slurry outlet where the swirling mass forms a vortexing slurry of ice and solution prior to discharge of the slurry through said slurry outlet, said latter means being located adjacent the upper section for flowing the incoming solution over the upper edge surface of said frusto-conical section adjacent the lower portion of the upper section and tangentially onto the inner wall surface of said frusto-conical section, and wherein said means for introducing the solution includes an incoming solution flow channel having an open end, said channel surrounding said upper vessel section adjacent the upper portion thereof, and said open channel end being separated from the chamber defined by the upper section only by the wall of the upper section, whereby solution overflowing from said channel will flow over the upper edge surface of said upper section and into said upper chamber, an a manifold assembly including means for tangentially introducing solution into said channel to swirl in and overflow from said channel into said chamber of the upper section, whereby the solution flowing from said channel flows across said upper edge surface of said upper section and is introduced tangentially onto the wall of the upper chamber to swirl along a spiral path to a location adjacent the slurry outlet of said lower section where the solution forms a vortexing slurry of ice and solution prior to discharge from said chamber of the lower section.

References Cited by the Examiner

UNITED STATES PATENTS

| | | |
|---|---|---|
| 1,755,810 | 4/1930 | Carney. |
| 1,972,730 | 9/1934 | Connell _____ 23—295 X |
| 2,883,273 | 4/1959 | Saeman _____ 23—295 |
| 3,010,832 | 11/1961 | Dahlstedt _____ 62—58 X |
| 3,103,792 | 9/1963 | Davids _____ 62—58 X |
| 3,160,490 | 12/1964 | Fabre _____ 62—58 X |

NORMAN YUDKOFF, *Primary Examiner.*